Nov. 21, 1967 J. K. PICCIANO 3,354,435

TRANSMISSION LINE CONTROL OF TRANSISTOR SELECTION MATRIX

Filed Feb. 19, 1965

INVENTOR
JAMES K. PICCIANO

BY Hughes, Rothwell, Mion, Zinn & Macpeak
ATTORNEYS

United States Patent Office 3,354,435
Patented Nov. 21, 1967

3,354,435
TRANSMISSION LINE CONTROL OF TRANSISTOR SELECTION MATRIX

James K. Picciano, Poughkeepsie, N.Y., assignor to International Business Machines Corporation, Armonk, N.Y., a corporation of New York Filed Feb. 19, 1965, Ser. No. 433,982
6 Claims. (Cl. 340—166)

The present invention relates to transistor selection matrices of the type wherein an individual transistor is gated on by applying proper signals concurrently to two electrodes of the individual transistor.

In a transistor matrix it is common to have the transistors arranged in rows and columns, and to have the signals applied to the transistors by column line drivers and row line drivers. Each column line driver is connected to an electrode, e.g., base, of all the transistors in a single column. The row line drivers are connected to a different electrode, e.g., emitter, of all the transistors in an individual row. Each single transistor occupies a space in one column and one row. The transistor is energized or turned on by turning on the row and column line drivers which are connected to that transistor.

Each of the transistors in the matrix has stray reactances associated with it. These stray reactances are made up primarily of the junction capacitances and small inductances between emitters of adjacent transistors. Thus, the electrode of an individual transistor sees a largely reactive impedance when it is being driven. The reactive impedance at the emitter causes a distortion of the output pulse when the transistor is being driven by coincident pulses at the emitter and base. Also, as a transistor is connected farther from the row driver, the reactance seen by the emitter of an individual transistor changes due to the stray capacitance and series inductance of all the transistors connected between the individual transistor and the row driver. The stray capacitance and series inductance combine and cause the individual transistor to see a complex reactive network. Since the different transistors are connected at different distances from the row drivers and therefore see different reactive impedances, the output pulse will depend upon the position of the transistor with regard to the row driver. The same problems occur at the base electrodes to which the column drivers are connected.

The above disadvantages are overcome by the present invention which makes use of the reactive impedances of the transistors to form a transmission line having a known resistive characteristic impedance. For example, the row line driver is connected to the emitters of all the transistors in an individual row by a line which is made to have a certain inductance between each transistor. The inductance of the line is of such a value that when it adds with the transistor stray reactances, primarily the junction capacitances, the combination of the line inductanes and the transistor stray reactances forms a transmission line having a resistive characteristic impedance. Both ends of the transmission line are terminated by the characteristic impedance. Consequently, each emitter, no matter what its distance from the row line driver, sees only the impedance $Z_0/2$, where $Z_0$ is the resistive characteristic impedance of the transmission line. The line which connects the bases of the transistors in an individual column to the column line driver is formed in the same way. Since each transistor sees only a resistive impedance and since the impedance which any transistor sees is independent of position, the output will not be distorted by stray reactances and the amplitude of the output will be independent of the transistor position.

Also, by forming a transmission line from the line connecting the transistor electrodes and the transistor stray reactances, the requirements for the line drivers are simpler. In a conventional transistor switching matrix the reactances tend to distort the pulse shape. If a flattop output pulse is desired, the drive pulse must have a shape which is predistorted to achieve the desired output pulse. In the circuit of the present invention the output pulse waveform is essentially similar to the drive pulse waveform.

The inventive circuit also provides an inherent emitter-feedback control due to the termination of the transmission lines by resistive characteristic impedances. This function will be explained below.

It is, therefore, an object of the present invention to provide a new and improved transistor switching matrix.

It is a further object of the present invention to provide an improved transistor switching matrix in which the amplitude of the output pulses is independent of transistor position.

It is a further object of the present invention to provide an improved transistor switching matrix having substantially flat output pulses.

The foregoing and other objects, features and advantages of the invention will be apparent from the following more particular description of a preferred embodiment of the invention, as illustrated in the accompanying drawings.

Figure 1:
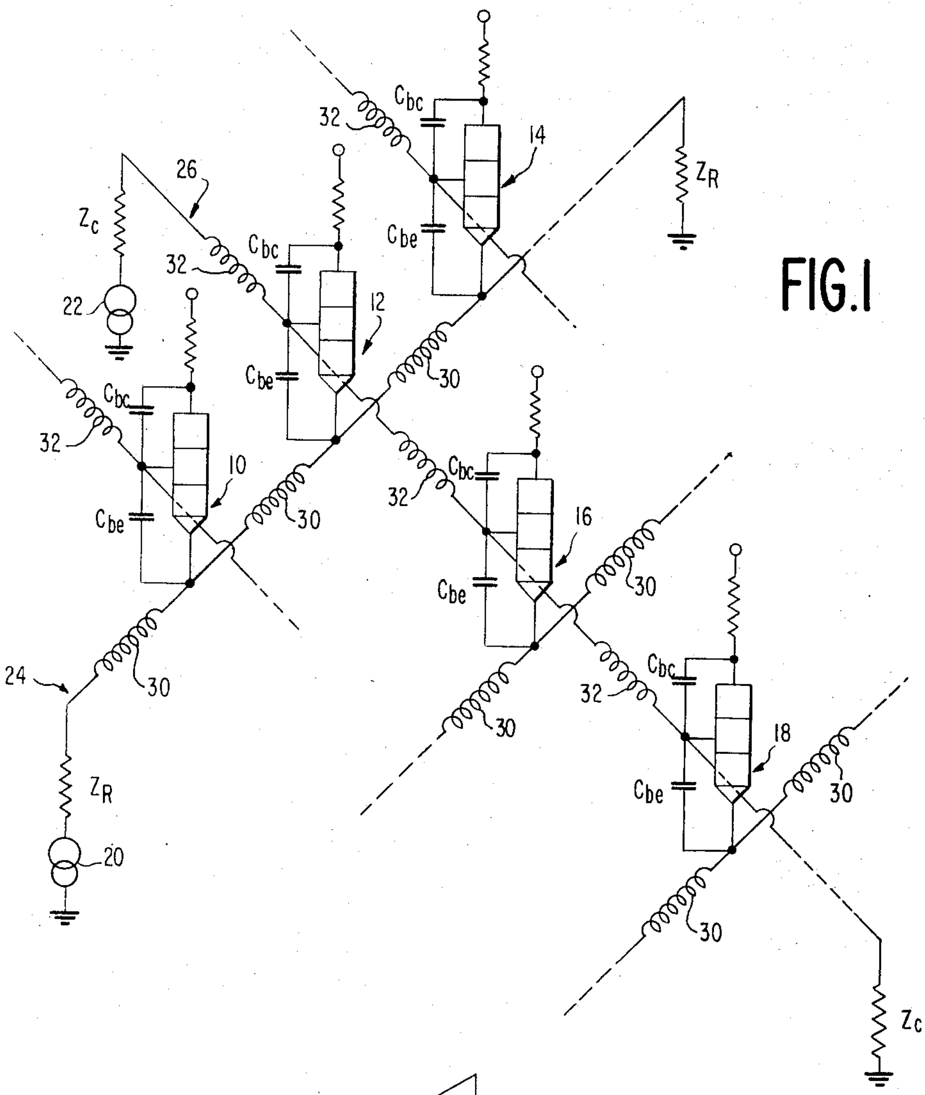
FIGURE 1 is a schematic diagram of a portion of the transistor switching matrix embodying the invention.

In FIGURE 1 there is shown only a single row and a single column of the transistor switching matrix. However, it is to be understod that in actual practice the matrix will have a plurality of columns and rows of transistors. The single row shown comprises transistors 10, 12 and 14. The single column shown comprises transistors 12, 16 and 18. The dashed lines indicate the existence of other transistors and other rows and columns. The transistors shown are NPN transistors; however, it should be readily apparent that PNP transistors may also be used. The transistors 10, 12 and 14, in an individual row, have their emitters connected to a pulse drive source 20 by means of line 24. The transistors 12, 16 and 18, in an individual column, have their bases connected to the pulse drive source 22 by a line 26. Each individual transistor, for example transistor 12, has stray reactances caused mainly by the junction capacitances and the inductances between emitters of the adjacent transistors. The stray base-to-emitter and base-to-collector capacitances are shown in FIGURE 1 as $C_{be}$ to $C_{bc}$ respectively. The stray inductances are not shown since they are insignificantly small compared to the inductances of the lines 24 and 26.

Referring to the row of transistors shown in FIGURE 1, the transmission line is formed by connecting line 24 to the emitters of the transistors in an individual row. The inductance of line 24 between emitters of adjacent transistors (shown as lumped constant inductors 30) has a particular value which, when combined with the stray reactances of the transistors, forms a row transmission line having a resistive characteristic impedance $Z_R$. Both sides of the row transmission line are terminated by the characteristic impedance $Z_R$.

The column transmission line is formed in the same way. The combination of inductances 32 and the base stray capacitances form a column transmission line having a characteristic resistive impedance $Z_c$. The impedance $Z_c$ terminates both ends of the transmission line.

The transistor switching matrix of FIGURE 1 operates as follows. Assuming transistor 12 is to be energized, row driver 20 is first turned on. A small but finite time after row driver 20 is turned on, the leading edge of the output pulse from driver 20 has traveled the length of the row transmission line and the signal from row driver 20 is stored in the transmission line. Column driver 22 is then turned on. When the pulse from column driver 22 reaches the base of transistor 12, the base-emitter junction of transistor 12 is forward biased and the transistor turns on. The energy at the emitter of transistor 12 is derived from the energy stored in the row transmission line. Consequently, the emitter of transistor 12 when first turned on electrically looks in both directions and sees the impedance $Z_r/2$. Since the impedance seen by the emitter of transistor 12 is resistive, there is substantially no distortion of the pulse rise time. During the transistor turn-on time and the collector output pulse rise time, the row driver 20 has no effect on the current because it is electrically far enough away from the emitters of any of the transistors so that it does not see the change in the emitter of transistor 12 until the rise time has been completed.

During the on time of transistor 12, the output pulse at the collector is substantially flat due to the feedback effect of the characteristic impedances $Z_r$. For example, if during the on time of transistor 12 the current tends to increase, the increased current across the impedances $Z_r$ tends to raise the voltage at the emitter junction, causing a decrease in the base-to-emitter forward bias with a consequent lowering of the transistor current. Consequently, the resistive characteristic impedances cause substantially flattop output pulses and the amplitude of the output pulses is independent of the transistor position.

The transistor switching matrix of FIGURE 1 will operate in the same manner if the column line driver 22 is turned on first and followed by initiation of the row line driver 20. It should be noted, that the second line driver (if row line driver 20 is turned on first, column line driver 22 would be the second line driver) should not be turned on until a finite time has passed after the turn-on of the first line driver. This is necessary so that the first line driver will be on a sufficient period of time to energize the entire transmission line with which it is associated. For example, if row line driver 20 is turned on first, column line driver 22 should not be turned on until the leading edge of the pulse from row line driver 20 has traveled the length of the row transmission line. This insures that the signal from the line driver will be stored in the transmission line and when an individual transistor is turned on, it will receive energy from both sides of the transmission line causing it to see the impedance $Z_r/2$.

Figure 2:
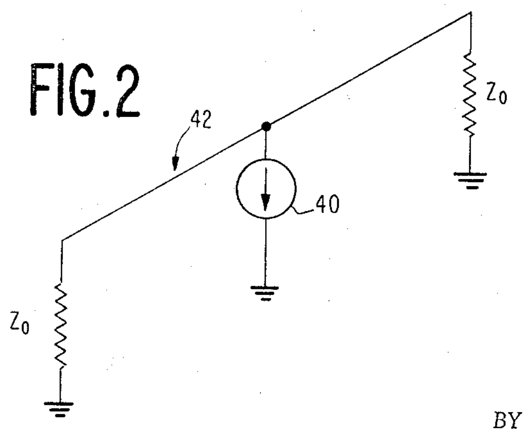
FIGURE 2 is a schematic of a single row or column of the matrix, with the transistors not shown, having the driver placed at a different position along the line from that shown in FIGURE 1.

In order to cut down the amount of time necessary to energize the entire transmission line, the line driver may be placed at a position other than that shown in FIGURE 1. For example, in FIGURE 2 where there is shown an indication of a transmission line 42 terminated by characteristic impedances $Z_0$, the line driver is a current source driver 40 which is placed in the middle of the transmission line. Thus, the time it would take to energize the transmission line would be cut in half. It is noted that in FIGURE 2 the inductances, capacitances and transistors which are actually present are not illustrated.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A transistor switch matrix having at least one row of transistors characterized by a drive line connecting all of the same terminals of each of the transistors in a row, said drive line being inductive and forming in combination with the stray reactances of said transistors a transmission line having a resistive characteristic impedance, and a pair of resistances each equal to said characteristic impedance terminating respectively both ends of said transmission line.

2. The transistor switch matrix claimed in claim 1 wherein said same terminals are the emitters of the transistors.

3. The transistor switch matrix claimed in claim 1 wherein said same terminals are the bases of the transistors.

4. A transistor switch matrix comprising:

(a) a plurality of transistors arranged in rows and columns, (b) row drive lines each connecting the emitters of the transistors in individual rows, (c) column drive lines each connecting the bases of the transistors in individual columns, (d) means for driving the row drive lines and means for driving the column drive lines, (e) said row drive lines being inductive and forming in combination with the stray reactances of the transistors to which they are connected row transmission lines having a resistive characteristic impedance and (f) a plurality of resistances equal to the characteristic impedance of said row transmission lines connected respectively to terminate said row transmission lines.

5. The transistor switching matrix claimed in claim 4 wherein said column drive lines are inductive and form in combination with the transistors to which they are connected column transmission lines having a resistive characteristic impedance and (a) a plurality of resistances equal to the characteristic impedance of said column transmission lines connected respectively to terminate said column transmission lines.

6. A transistor switching matrix characterized by transmission lines supplying energy to said transistors; each said transmission line having a plurality of said transistors connected thereto at individual points thereon; each of said transmission lines comprising inductive elements connected between said plurality of transistors and stray reactances of said plurality of transistors, and resistance elements equal to the characteristic impedance of said transmission lines connected to terminate said lines.

No references cited.

THOMAS B. HABECKER, *Acting Primary Examiner.*

H. I. PITTS, *Assistant Examiner.*